T. F. NELSON.
Fertilizer.
No. 10,325.                                           Patented Dec. 20, 1853.
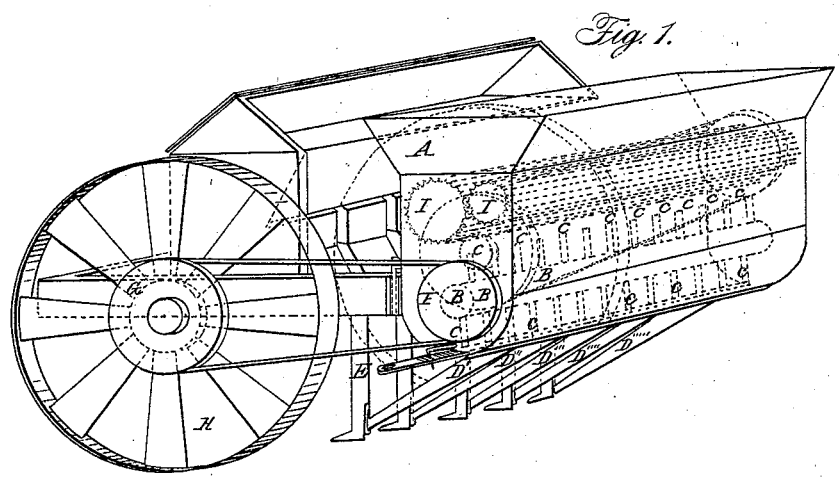
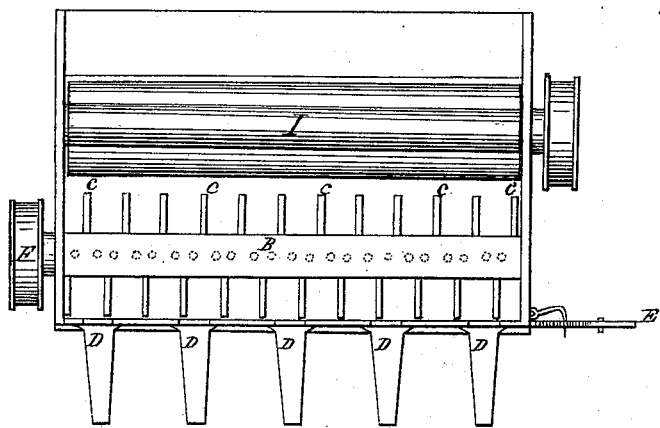
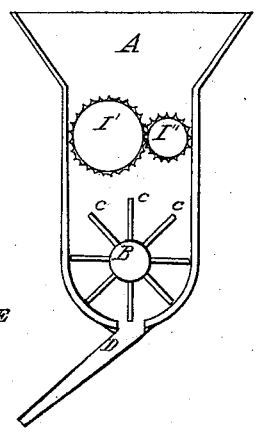
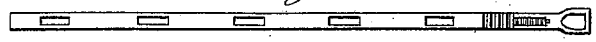
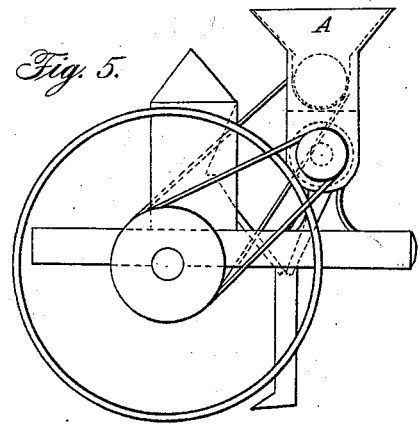
Witnesses:                                         Inventor:

UNITED STATES PATENT OFFICE.

THOMAS F. NELSON, OF CLARKE COUNTY, VIRGINIA.

IMPROVEMENT IN MANURE CRUSHERS AND SOWERS.

Specification forming part of Letters Patent No. 10,325, dated December 20, 1853.

*To all whom it may concern:*

Be it known that I, THOMAS F. NELSON, of Clarke county, in the State of Virginia, have invented a new and improved mode of sowing guano and other pulverized manures and of pulverizing the same for sowing with wheat and other grains, and have invented certain machinery for the above purpose; and I do hereby declare that the following is a full and exact description thereof, reference being had to the accompanying drawings, and to the letters of reference marked thereon, in which—

Figure I is a perspective view. Fig. II is a front elevation; Fig. III, a sectional view; Fig. IV, a view of the slide E, and Fig. V a sectional view of the machinery placed on a seed-planter in a different position.

The nature of my invention consists in providing an attachment consisting of certain mechanical arrangements, to be hereinafter described, which may be easily affixed to any seed-planter intended for sowing wheat or other grains or seeds in drills, by means of which attachment, in combination with an ordinary seed-planter, guano and other pulverized manures may be sown in the same furrow in which the seed is deposited and at the same time.

By my invention the guano or other manures capable of and requiring to be triturated may be completely pulverized by the same power by which the seed is planted and the guano deposited.

My invention is founded upon certain facts which I believe have first been observed by me, and which are opposed to the opinions generally entertained by practical farmers; and my invention is a practical application of an original scientific discovery.

The great fact which is the foundation of my invention, and which I have discovered by experiment, is that guano may be deposited with great advantage to the crop in the same furrow in which the seed is deposited and in immediate contact with the seed, provided the amount of guano thus deposited is carefully graduated. This fact is so much opposed to the opinions generally prevalent that special inventions have been made and patented for sowing the guano in such a manner that it should not be in contact with the seed.

By the ordinary mode of sowing guano—namely, that of sowing it broadcast—a large portion of the manure is wholly lost. If the wheat is sowed by a seed planter or drill upon soil thus manured, a large portion of the guano deposited between the furrows is lost. The guano is also distributed irregularly and is scattered by the wind.

By the usual mode of sowing guano from two hundred to four hundred pounds per acre are required, while by sowing it in drills by means of my invention from forty to one hundred pounds per acre only are required. The guano cannot be advantageously sown with the seed in a common seed-planter, as the guano would clog and prevent the egress of the seed and guano, as the quantity of the manure cannot be regulated.

My invention enables the farmer to regulate and vary the quantity of guano or other pulverized manures to be sown according to the requirements of the soil without varying the quantity of the seed.

An expenditure of much labor and expense is ordinarily required to pulverize the guano so that it can be advantageously applied to the soil. By my invention this work is done by means of the power which actuates the seed-planter and deposits the guano.

To enable practical farmers to make and use my invention, I will proceed to describe its construction and operation.

To any ordinary seed-planter and behind the drills and the tubes through which the seed is deposited I attach a box, A, having a flaring or hopper-like opening at the top and a circularly-formed bottom. Within this box I place a shaft, B, into and around which are spirally placed iron or strong wooden teeth or pins C' C' C. The teeth or pins project from the shaft so far as just to admit the shaft B with the pins being turned round without interfering with the circular bottom of the box A.

In the bottom of the box A are placed holes corresponding to the number of drills in the seed-planter to which the attachment is applied. Into these holes are inserted tubes D D, about one inch in diameter, corresponding also to the number of drills in the seed-planter. These tubes are placed underneath the box at such an angle as to convey the guano into the leather pipe, which conveys the seed into the tooth of the seed-planter.

On the bottom of the box A is a slide, E, having holes corresponding to those in the box. This slide is constructed so that it may be drawn out, by which means the aperture through which the guano passes is diminished, and thereby the quantity of guano or other manure passing through the holes is regulated or entirely stopped. On the end of the slide is a graduated scale, by observing which the quantity of guano to be sown to the acre is known.

On the end of the shaft B and on the outside of the box I place a pulley, F. This pulley is connected by a cord or band with another pulley or drum, G, placed outside of the wheel H of any ordinary seed-planter. The pulley G can be easily attached to the wheel of any seed-planter without interfering with the machinery by which the drill or seed-planter is actuated.

The motion of the wheels of the seed-planter as it is drawn along in the field causes the shaft B to revolve within the box.

The mode of communicating the power from one of the wheels of the seed-planter to the shaft B may be varied at pleasure. The guano or other manure, being deposited in the box, is stirred up by the revolution of the toothed shaft B and falls through the tubes D' D'' into the furrows made by the drills of the seed-planter and immediately in contact with the seed, which is deposited at the same time.

When manures which have been previously finely pulverized are used only the machinery above described is required; but if it is necessary, as in most instances, to pulverize or grind the guano, which, when obtained in market, is full of hard lumps, the machinery hereinafter described comes into operation.

Above the toothed shaft B, within the box A, I place two fluted or toothed iron cylinders, I' I'', of different diameters. These cylinders are made to revolve by means of a pulley placed outside the box at the other end and opposite to the shaft-pulley F. The pulley connected with the fluted cylinders is connected by a cord or band with a pulley or drum placed on the other wheel of the seed-planter. The revolution of this wheel when in motion causes the revolution of the fluted iron cylinders.

Instead of two fluted iron cylinders, a single fluted cylinder revolving upon a circular bottom of fluted iron may be used, as shown in Fig. V.

The unground guano is placed in the hopper or box above the cylinders and ground by the revolution of the fluted cylinders. Thence it passes to the toothed shaft below, which distributes it.

The box containing the distributing and grinding machinery may be placed in different positions on the seed-planter, as shown in Figs. I and V.

What I claim as my invention, and desire to secure by Letters Patent, is—

The combination of the fluted or toothed cylinders I' I'' with the toothed shaft B, operating, as above described, for the purpose of grinding and distributing guano or other pulverized manures, in the manner above set forth, the whole being in combination with any ordinary seed-planter.

T. F. NELSON.

Witnesses:
JOHN L. HAYES,
G. H. NORTHROP.